No. 851,699. PATENTED APR. 30, 1907.
D. W. SMITH.
CORN SHOCKING MACHINE.
APPLICATION FILED JULY 7, 1906.
3 SHEETS—SHEET 1.
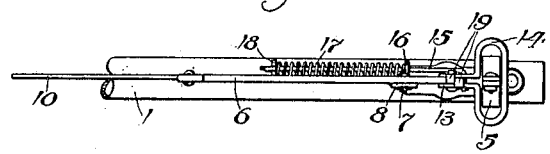
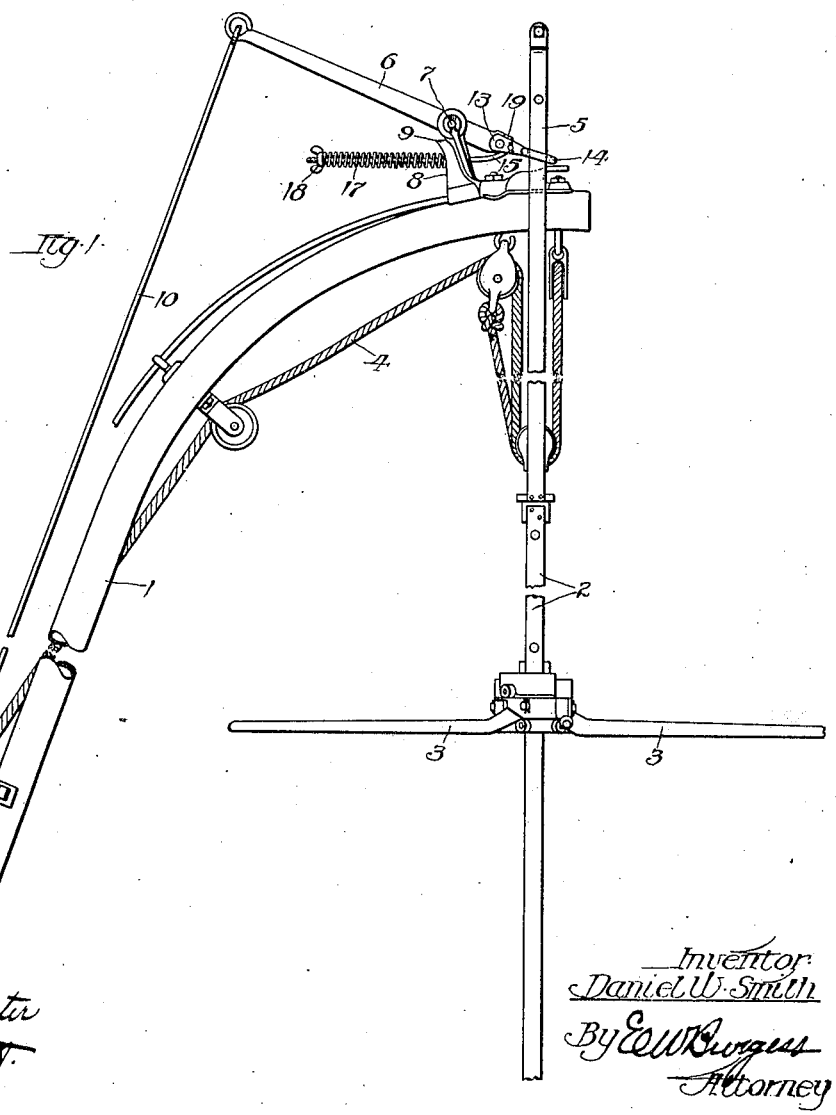
Witnesses:
F. W. Hofmeister
J. M. Daggett
Inventor:
Daniel W. Smith
By E. W. Burgess
Attorney No. 851,699. PATENTED APR. 30, 1907.
D. W. SMITH.
CORN SHOCKING MACHINE.
APPLICATION FILED JULY 7, 1906.
3 SHEETS—SHEET 2.
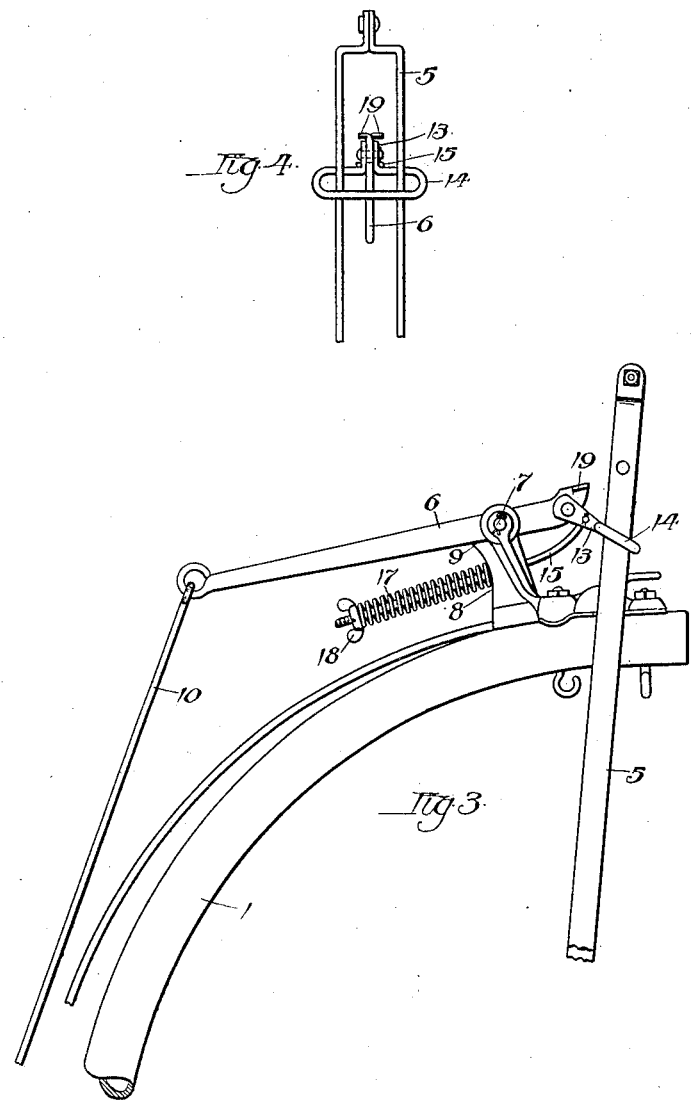

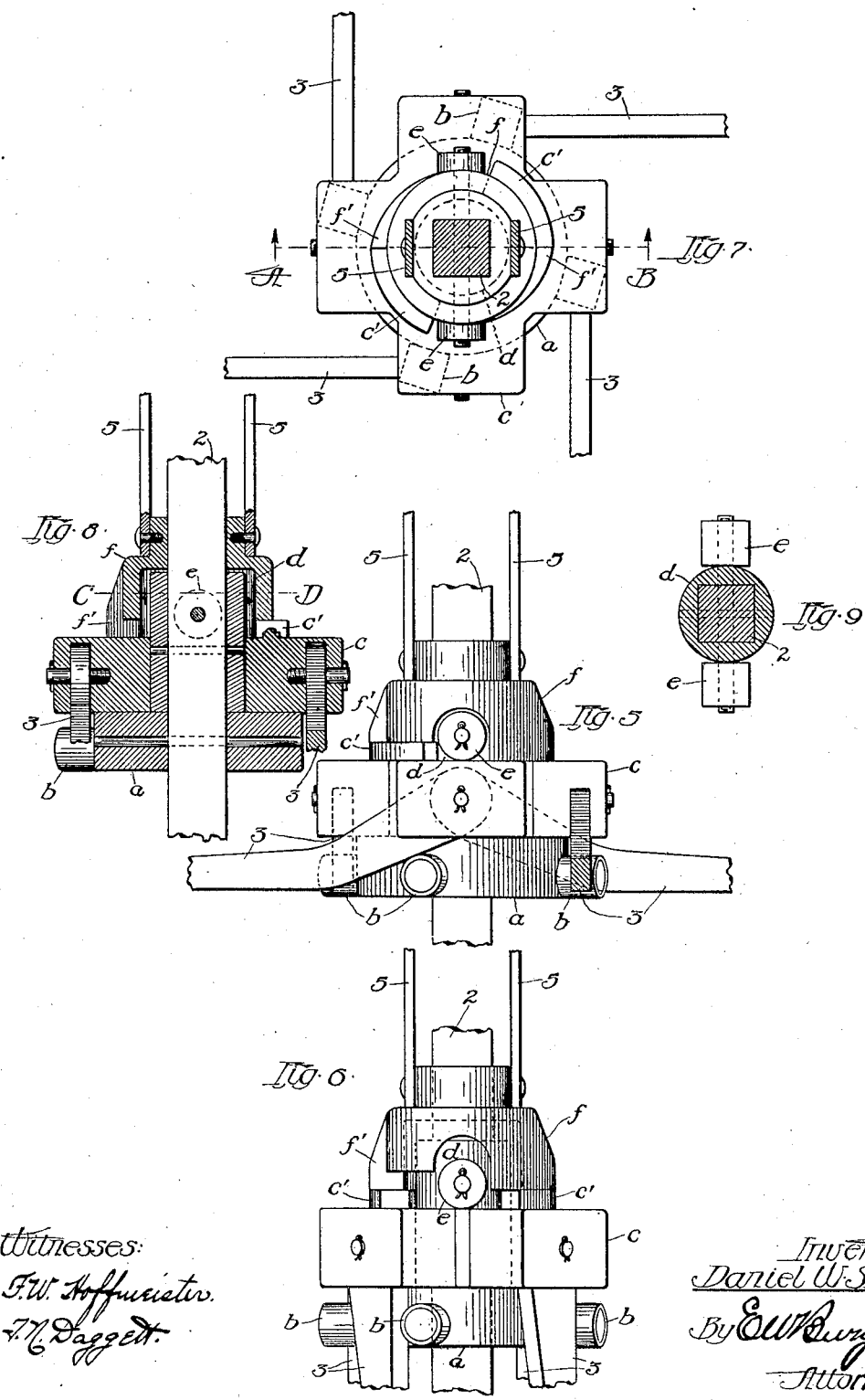

UNITED STATES PATENT OFFICE.

DANIEL W. SMITH, OF CHICAGO, ILLINOIS, ASSIGNOR TO INTERNATIONAL HARVESTER COMPANY, A CORPORATION OF NEW JERSEY.

CORN-SHOCKING MACHINE.

No. 851,699.  Specification of Letters Patent.  Patented April 30, 1907.

Application filed July 7, 1906. Serial No. 325,071.

*To all whom it may concern:*

Be it known that I, DANIEL W. SMITH, a citizen of the United States, residing at Chicago, in the county of Cook and State of Illinois, have invented certain new and useful Improvements in Corn-Shocking Machines, of which the following is a specification, reference being made to the accompanying drawings, forming a part thereof.

My invention relates to corn shocking machines, and particularly to the mechanism for tripping the shock lifter when it is swung to position to deliver the shock therefrom, and consists in means whereby the mechanism that sustains the shock may be released at any plane of its elevation and independent of any downward movement of the shock carrying mechanism.

Referring to the drawings—Figure 1 represents a side elevation of a part of a shock supporting mechanism embodying my invention; Fig. 2 is a plan view of the tripping mechanism as shown in Fig. 1 above the hoisting mechanism; Fig. 3 is a side elevation of the tripping mechanism; and Fig. 4 is a detail of some of the associated parts thereof. Fig. 5 is a side elevation showing the manner in which the folding arms of the shock former are locked in extended position; Fig. 6 is a side elevation of the same mechanism shown in Fig. 5, and representing the arms in folded position; Fig. 7 is a top plan view of Fig. 5; Fig. 8 is a cross section on line A—B of Fig. 7; and Fig. 9 is a cross section of part of Fig. 8 on line C—D.

The same reference numerals designate similar parts throughout the several views.

1 is a common form of swinging boom that is pivotally mounted upon the machine, and 2 is the shock former and carrier, having the radially projecting arms 3 pivotally mounted thereon in a manner to adapt them to fold inward and downward to release the shock in the well-known way. The shock former is connected with the boom by means of a lifting cable 4, and 5 is the usual tripping bar slidably engaging with the boom in a manner to contact therewith and release the mechanism sustaining the radial arms when the shock and former have been released from the shock elevating mechanism.

When the shock retaining arms are tripped in the manner described, it is necessary for the shock-former and shock to descend until the tripping bar contacts with the boom in a manner to move it longitudinally relative to the shock-former and release the locking mechanism engaging with the radially projecting arms.

The preferred form of mechanism for controlling the movement of the arms 3 comprises a collar $a$ secured to the shock former and having rollers $b$ radially mounted thereon in a manner to contact with the arms 3 that are pivotally connected with a rotatable ring $c$ loosely mounted upon a sleeve $d$ secured to the shock former, the sleeve being provided with radially projecting rollers $e$ adapted to contact with the upper surface of the ring $c$ in a manner to prevent it sliding upward upon the sleeve.

Surrounding the upper end of the sleeve and movable longitudinally upon the shock former, which is angular in section, is a cup-shaped tripping member $f$, having the lower end of the tripping member 5 secured thereto. The upper surface of the ring $c$ is provided with clutch members $c^1$ integral therewith and adapted to contact with opposing clutch members $f^1$ integral with the tripping member $f$.

In Fig. 5 the arms 3 are shown extended and are held in that position by reason of their contact with the rollers $b$; the ring $c$ being held against rotation by means of the clutch members $c^1$ and $f^1$. When the clutch members are released from their engagement with each other by means of the tripping bar 5, the ring $c$ is free to rotate and the arms 3 assume the folded position as shown in Fig. 6.

My improved form of tripping mechanism consists in a lever 6 pivotally mounted on the boom by means of a cross-pin 7 engaging with the lever, and a standard 8 secured to the boom, the standard being provided with a stop shoulder 9 adapted to contact with the lever in a manner to limit its movement in one direction, as shown in Fig. 3. Pivotally connected with the long arm of the lever is an operating rod 10, having a common form of hand piece 11 at its lower end within convenient reach of the operator, the rod being supported by an eye-piece 12 secured to the boom. Pivotally connected with the short arm of the lever 6 is a lever 13, having at its outer end a loop portion 14 embracing the tripping bar 5, and 15 is a link having one end pivotally connected with the lever 13 and passing through a guiding eye 16 on the standard 8, is provided with a coiled spring 17 surrounding the rod and operative between the eye-piece and an adjusting nut 18 in a manner to normally retain the two levers in alinement, as showe in Fig. 1. To prevent the levers from moving out of alinement in one direction, the lever 6 is provided with laterally projecting stop shoulders 19 adapted to contact with the lever 13, as shown in Fig. 1. When the levers are in their normal position the tripping bar is free to slide through the loop portion 14 of the lever 13 and permit the shock to be raised by the hoisting mechanism, and when it is swung to position to be deposited upon the ground, the operator pulls downward upon the rod 10 and causes the loop 14 to clutch the tripping-bar 5, and a continued movement of the rod causes the lever mechanism to move the bar upward relative to the shock-former and thus release the locking means connected with the radially projecting arms and allow the shock to be released therefrom.

What I claim, and desire to secure by Letters Patent, is:

1. A corn shocking machine comprising, in combination, a swinging boom, a shock-former, hoisting means connecting the shock-former with said boom, a series of radially projecting arms pivotally connected with said shock-former, releasable mechanism adapted to lock said arms in a radial position, means for releasing said locking mechanism, said means comprising a vertically arranged tripping-bar connected with said locking mechanism, and a lever mechanism mounted upon said boom under control of the operator and adapted to move said tripping-bar independently of said shock-former.

2. A corn shocking machine comprising, in combination, a swinging boom, a shock-former, hoisting means connecting said shock-former with said boom, a series of radially projecting arms pivotally connected with said shock-former, releasable mechanism adapted to lock said arms in radial position, means for releasing said locking mechanism, said means comprising a vertically arranged tripping-bar connected with said locking mechanism, and a lever mechanism mounted on said boom under control of the operator and adapted to clutch said tripping-bar when said lever is moved in one direction in a manner to move said bar vertically independent of the shock-former.

3. A corn shocking machine comprising, in combination, a swinging boom, a shock-former, hoisting means connecting said shock-former with said boom, a series of radially projecting arms pivotally connected with said shock-former, releasable mechanism adapted to lock said arms in radial position, means for releasing said locking mechanism, said means comprising a vertically arranged tripping-bar connected with said locking mechanism, a two-part lever pivotally mounted upon said boom having a hand operative rod connected with one end thereof and its opposite end adapted to engage with said tripping-bar and move it vertically when said two-part lever is moved in one direction.

4. A corn shocking machine comprising, in combination, a swinging boom, a shock-former, hoisting means connecting said shock-former with said boom, a series of radially projecting arms pivotally connected with said shock-former, releasable mechanism adapted to lock said arms in radial position, means for releasing said locking mechanism, said means comprising a vertically arranged tripping-bar connected with said locking mechanism, a two-part lever pivotally mounted on said boom having a hand operative rod connected with one part thereof and the other part provided with a loop embracing said tripping-bar and adapted to clutch therewith when said lever is moved in one direction.

5. A corn shocking machine comprising, in combination, a swinging boom, a shock-former, hoisting mechanism connecting said shock-former with said boom, a series of radially projecting arms pivotally connected with said shock-former, releasable mechanism adapted to lock said arms in radial position, means for releasing said locking mechanism, said means comprising a vertically arranged tripping-bar connected with said locking mechanism, a two-part lever pivotally mounted on said boom having a hand operative rod connected with one part thereof, and the other part provided with a loop loosely embracing said tripping-bar when said two-part lever is in a normal position, and adapted to clutch said bar when the lever is moved away from said position, and a spring operative to yieldingly hold said lever in normal position.

6. A corn shocking machine comprising, in combination, a swinging boom, a shock-former, hoisting mechanism connecting said shock-former with said boom, a series of radially projecting arms pivotally connected with said shock-former, releasable mechanism adapted to lock said arms in radial position, means for releasing said locking mechanism, said means comprising a vertically arranged tripping-bar connected with said locking mechanism, a two-part lever pivotally mounted on said boom having a hand operative rod connected with one part thereof, and the other part provided with a loop loosely embracing said tripping-bar when said two-part lever is in a normal position, and adapted to clutch said bar when the lever is moved away from said position, a spring operative to yieldingly hold said lever in normal position, and stop shoulders on one part of said lever contacting with the other part when the lever is in normal position.

DANIEL W. SMITH.

Witnesses:
WM. N. SCHNEIDER,
A. F. PENCIKEWICZ.